United States Patent [19]

Barnett

[11] Patent Number: 5,441,144

[45] Date of Patent: Aug. 15, 1995

[54] METHOD AND APPARATUS FOR REDUCING CONVEYOR BELT SPILLAGE

[75] Inventor: Barry J. Barnett, Mudgee, Australia

[73] Assignee: Barnett Investments Pty Limited, Mudgee, Australia

[21] Appl. No.: 982,756

[22] PCT Filed: Sep. 11, 1991

[86] PCT No.: PCT/AU91/00421

§ 371 Date: May 12, 1993

§ 102(e) Date: May 12, 1993

[87] PCT Pub. No.: WO92/05095

PCT Pub. Date: Apr. 2, 1992

[30] Foreign Application Priority Data

Sep. 13, 1990 [AU] Australia ............................. PK2295
Apr. 29, 1991 [AU] Australia ............................. 76236/91

[51] Int. Cl.6 .................................................. B65G 47/31
[52] U.S. Cl. ...................................... 198/499; 198/561
[58] Field of Search ............... 198/537, 560, 561, 568, 198/497, 499, 569, 445, 442, 452, 447

[56] References Cited

U.S. PATENT DOCUMENTS

| | | | |
|---|---|---|---|
| 2,007,874 | 7/1935 | Redler | 198/561 X |
| 2,375,697 | 5/1945 | Sinden | 198/561 X |
| 4,068,755 | 1/1978 | Parkes et al. | |
| 4,366,628 | 1/1983 | George | 198/561 X |
| 4,921,089 | 5/1990 | Teske | 198/561 X |

FOREIGN PATENT DOCUMENTS

| | | |
|---|---|---|
| 1077563 | 11/1954 | France . |
| 682292 | 10/1939 | Germany . |
| 3708219 | 9/1988 | Germany . |
| 85-01717 | 4/1985 | WIPO . |

*Primary Examiner*—D. Glenn Dayoan
*Attorney, Agent, or Firm*—Ladas & Parry

[57] ABSTRACT

A conveyor (101) to minimize spillage in which the forward run (108) is located below the return run (107) and arranged so that any carry back material dislodged from the return run (107) drops onto the forward run (108).

13 Claims, 7 Drawing Sheets

METHOD AND APPARATUS FOR REDUCING CONVEYOR BELT SPILLAGE

FIELD OF INVENTION

The present invention relates to spillage from conveyor belts such as are used to convey coal or like material such as mineral ores and other particulates. In particular, the present invention discloses a method and apparatus for reducing spillage of the conveyed material from such conveyor belts.

BACKGROUND ART

Conventional conveyor belts comprise an endless loop of conveyor belt which passes over various rollers. Despite various drive roller, head roller and tail roller configurations the belt essentially consists of two runs which are positioned one above the other and extend between a source location and a destination location. In operation the belt travels in opposite directions on the two runs.

The coal, iron ore, bauxite or similar mineral or other particulate material is loaded onto the upper surface of the upper run at the source location and is discharged from this material conveying surface at the destination location. On the lower (return) run, the material conveying surface forms the lower surface.

The conveyed material which is not discharged at the designation location continues with the belt and is termed "carry over". This carry over material which adheres to the belt, often despite the actions of a scraper blade positioned to scrape the material carrying surface of the belt at the destination location, is subject to all the vibration which the belt on the return run experiences. Accordingly, this carry over material is dislodged from the lower surface of the belt during the return run and falls downwardly to the floor of the mine, or working surface of the stockpiling operation.

Such spillage represents a substantial volume, up to 2%, of the total material conveyed. Accordingly, it is not unknown for the depth of such spillage to reach, and even exceed, the height of idler rollers over which the return run of the belt moves. A substantial cost of any such mining or conveying operation is the cost of removing such belt spillage. In a typical Australian underground coal mine utilising longwall mining techniques, approximately 2 million tonnes (tons) are produced each year. The conveyor line to convey this material often consists of eight individual conveyors with a total transport distance from coal face to stock pile of approximately 8 kms (5 miles). It is not unknown for the cost of returning the spillage to the upper surface of the upper run of the conveyor belt to cost more than the spilled material is worth.

In an effort to reduce the volume of carry over material, the material carrying surface of the conveyor belt is normally scraped. Such scrapers fall into two distinct categories. One category is the light scraper which uses a wire, rubber blade, or similar relatively flexible scraper which is intended primarily to dislodge any loose material from the belt surface. The other category of scraper is a hard scraper having a blade of tungsten carbide, or similar. Although such hard scrapers reduce the volume of carry over material, they also substantially contribute to belt wear, by up to 30% under normal operating conditions. In the event of some malfunction, the hard scraper can tear or rip a belt to an extent that it has to be replaced.

In addition to the above mentioned problems of loss of yield, the cost of cleaning up, and the wear of the belt caused by hard scrapers; the problem of carry back and subsequent belt spillage produces other undesirable side effects. In particular, with coal the presence of fine coal dust on the floor of the mine constitutes a substantial fire hazard. In addition to the belt being progressively buried by carry back material, the carry back material also interferes with the operation of rollers, tail tensioners, and other standard items of conveyor apparatus since the material is continually being showered in fine particulate and generally abrasive material.

The carry back of fine particulate material on the return run of conveyors is a much greater problem to present day conveyor operators than in years past. There are two basic reasons for this. Firstly the speed at which conveyor belts are operated has increased dramatically through improved technology. High belt speeds cause the fine material to vibrate and move through the bed of material carried on the belt thus coming into contact with the belt itself.

Secondly, environmental and health considerations require dust to be suppressed as much as possible. The preferred method of suppressing dust is to use water sprays. As a consequence of this activity, a thick layer of wet and sticky material is formed on the belt. This wet and sticky material is particularly difficult to remove by means of scrapers at high belt speeds but drys on the return run and then falls from the belt. This is a severe problem with long belts.

It is known to attempt to overcome the above mentioned problem by the provision of two belt turnover mechanisms each of which longitudinally twists the conveyor belt. Each belt turnover mechanism is located on the return run, one at the beginning of the return run and the other at the end of the turn run. The first turnover mechanism twists the return run so that the material carrying surface is uppermost on the bulk of the return run length, while the second belt turnover mechanism reverses the return run to its original disposition. This system is costly and mechanically complex thereby making it vulnerable to frequent breakdown and substantially increasing the cost of required maintenance.

The object of this prior art approach is to prevent carry over spilling from the belt other than at the beginning and end of the return runs. This at least reduces the spatial problem of belt spillage but does nothing to reduce the volume of belt spillage or the problem of particulate material raining down on tail rollers, and the like.

Patent novelty searches conducted after the making of the present invention have disclosed some prior art, It is known from German Patent Specification No. 3,225,551 to avoid the cost of a roof to cover an overland conveyor by conveying the material on the upper surface of the lower run and using the return run above to protect the material from the weather. There is no mention of the problem of spillage of the material conveyed.

The abovementioned search also disclosed PCT/SE84/00143 published under No. 85/02831 which is concerned with a grain elevator where grain in a trough is conveyed both by vanes on the underside of the belt which scrap along the trough and also by simply being carried by the upper surface of the lower run of the belt if the trough is overfilled. There is clearly no adhesion between the conveyed grain and the belt, indeed a belt with small openings therethrough is disclosed. Because of the trough, the problem of spillage from the belt does not arise. U.S. Pat. No. 3,219,173 makes a similar disclosure.

U.S. Pat. No. 4,068,755 also disclosed by the search discloses an analogous arrangement for use by slurries within a flume trough. Here the conveyor moves heavy particles within the trough which happen to settle out of the slurry onto the upper surface of the conveyor's lower run. The remainder of the slurry flows under gravity through the flume trough. Again the question of material spilling from the trough does not arise because of the presence of the trough.

It is also known from British Patent No. 474,839 of 1937 disclosed in the abovementioned search to convey coal on the upper surface of the lower run of a conveyor belt. This specification discloses a T-shaped conveyor configuration which is intended to convey coal from opposite arms of the cross piece of the T, and then lead the material to the head of the stem of the T. In order to fabricate the conveyor belt of the cross piece of the T from a single belt, and thereby be able to use a single drive mechanism, a belt configuration is adopted in which on one arm of the cross piece of the T, material is conveyed on the upper surface of the lower run of the belt.

This T-shaped conveyor configuration is essentially impractical in mining in that it makes it extremely difficult for men and equipment to be moved alongside the stem of the T, and then past the cross piece of the T, without either going around one arm of the cross piece, or crossing the belt itself. The specification is entirely silent as to the problems of belt spillage, carry over and the like.

OBJECTS OF THE INVENTION

The object of the present invention is to reduce the volume of carry back material falling from the return run of a conveyor belt. This is achieved not by reducing the volume of the carry back material, but by ensuring that substantially all material carried back is able to fall onto the material being conveyed. If the material conveyed is carried on the upper surface of the lower run, below the return run, then any carry back material adhering to the lower surface of the return run, if dislodged, falls downwardly. This dislodged carry over material then automatically re-joins the material being conveyed to the intended destination. In this way, although material falls from the belt, it does not spill onto the floor of the mine or the ground.

SUMMARY OF THE INVENTION

According to a first aspect of the present invention there is disclosed a method of reducing belt spillage whilst conveying coal or other material by means of a conveyor belt comprising an endless loop having two runs positioned one above the other, extending between a source location and a destination location, and, in operation, travelling in opposite directions; said method comprising the steps of loading said material to be conveyed onto the upper surface of the lower one of said runs at said source location, moving said lower run in the direction from said source location to said destination location, and discharging substantially all said material from said lower run at said destination location, that face of said belt comprising the upper surface of said lower run also comprising the lower surface of said upper run whereby any of said material not discharged from said belt at said destination location and subsequently dislodged from said upper run lower surface drops onto said lower run upper Surface to be re-conveyed thereby to said discharge location.

In accordance with a second aspect of the present invention there is disclosed apparatus for reducing belt spillage whilst conveying coal or other material, said apparatus comprising an endless loop of conveyor belt having two runs positioned one above the other, said runs extending between a source location and a destination location; drive roller means engaging said belt and arranged to drive said runs in opposite directions, said runs being spaced apart sufficiently at said source location to permit said material to be loaded onto the upper surface of said lower run; discharge means at said destination location to permit said loaded material to be discharged from said surface; and roller means over or around which said belt passes and configured to make that face of said belt comprising the upper surface of said lower run, the lower surface of said upper run; whereby any of said material not discharged from said belt by said discharge means and subsequently dislodged from said upper run lower surface drops onto said lower run upper surface to be re-conveyed thereby to said discharge means.

BRIEF DESCRIPTION OF THE DRAWINGS

Some embodiments of the present invention will now be described with reference to the drawings in which.

DESCRIPTION OF THE PREFERRED EMBODIMENTS

Figure 1:
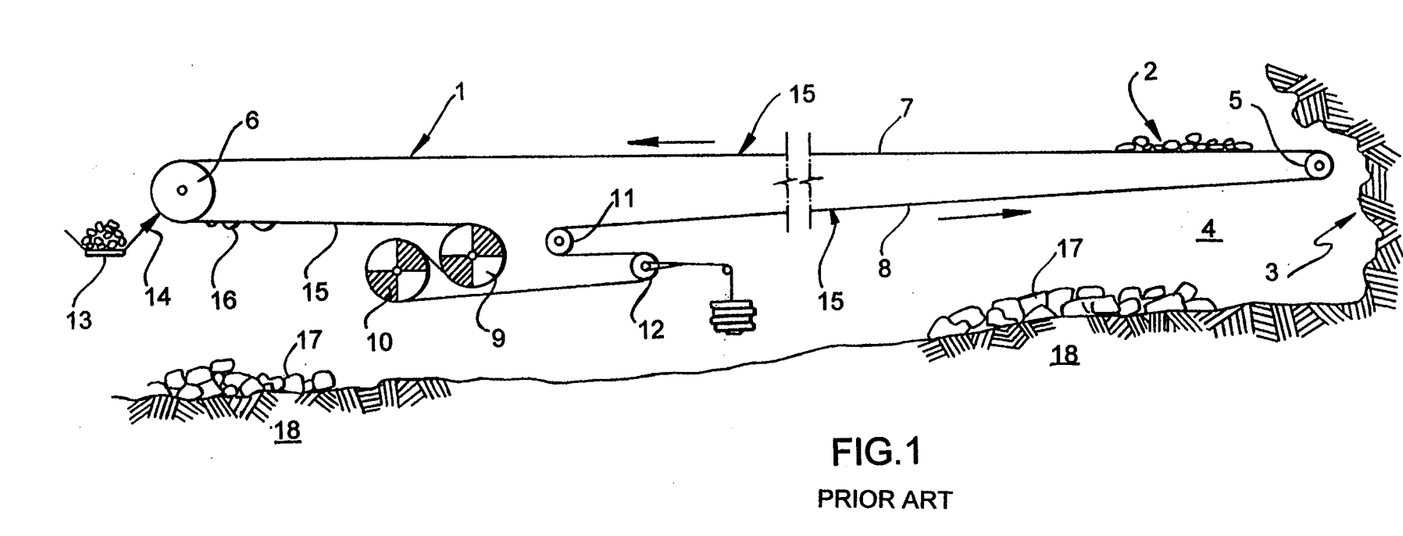
FIG. 1 is a schematic side elevation of a prior art conveyor as used in the mining industry.

As seen in FIG. 1, a conventional underground trunk conveyor belt 1 is used to convey coal 2 from a coal face 3. The coal face 3 is located at the end of a gallery 4 and constitutes a source location.

The conveyor belt 1 extends between a tail roller 5 and a discharge roller 6 and is thereby formed into an upper, forward, run 7 and lower, return run 8. On the return run 8 are located two drive rollers 9, 10 and gravitationally biased tensioning rollers 11, 12.

Most of the coal 2 which is loaded onto the upper run 7 reaches the discharge roller 6 and falls therefrom under the influence of gravity onto the belt 13 of a second conveyor system. A scraper 14 is positioned so as to abut the coal carrying surface 15 of the belt 1 as it rounds the discharge roller 6. As a consequence, much of the coal 2 which adheres to the coal carrying surface 15 is discharged into the second conveyor 13. However, as indicated at 16, carry back material still adheres to the coal carrying surface 15 as schematically illustrated in FIG. 1. This carry back material 16 falls downwardly to form an every growing deposit 17 on the floor of the mine 18.

It will be apparent that the carry back material 16 can, in time, interfere with the operation of the drive rollers 9, 10, the tensioning rollers 11, 12, the tail roller 5, discharge roller 6, and various idler rollers (not illustrated) which support the conveyor belt 1 on both the forward and return run. In particular, the depth of the deposits 17 can often grow to the same height as the idler rollers which support the return run 8.

Figure 2:
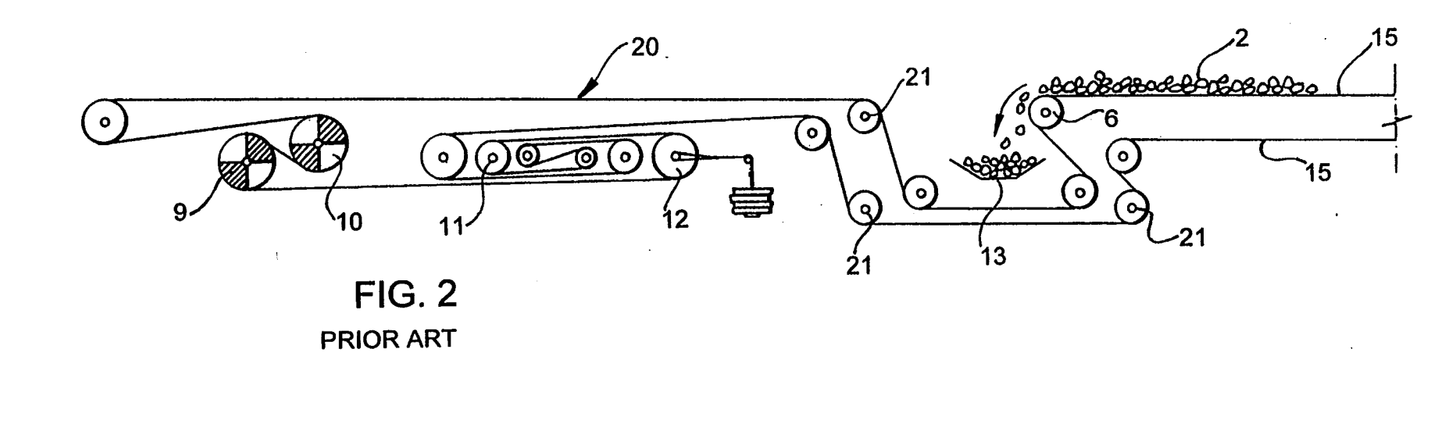
FIG. 2 is a partial side elevational view of the discharge and drive end of a conventional longwall maingate conveyor used in underground coal mining.

Turning now to FIG. 2, the discharge end of a prior art longwall maingate conveyor 20 is illustrated. Again the coal 2 is carried on the upper surface 1S of the forward run 7 and is discharged onto a second conveyor belt 13. The drive rollers 9, 10 are substantially the same. However, the tensioning roller arrangement 11, 12 now includes six rollers three of which come into contact with the coal carrying surface 15. Similarly, approximately half of the remaining rollers 21 also come into contact with the coal carrying surface 15.

Figure 3:
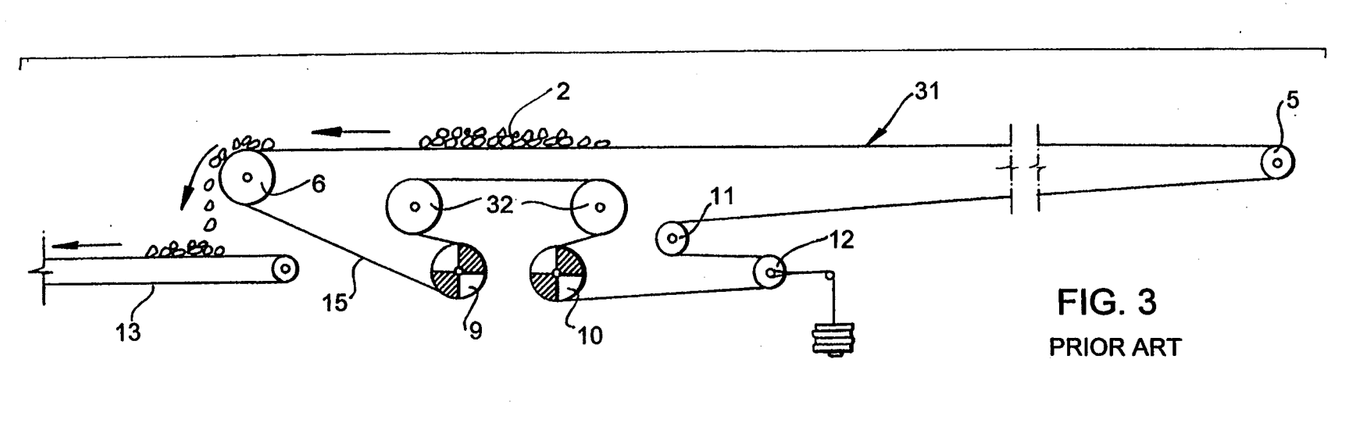
FIG. 3 is a side elevational view of a prior art surface main conveyor illustrating in-line transfer and clean side drives.

FIG. 3 illustrates a typical prior art surface main conveyor 31 which discharges by in-line transfer onto a second conveyor 13. The tail roller 5 and discharge roller 6 are as before, however, the configuration of the drive rollers 9, 10 is different in order to achieve engagement of both drive rollers with the surface of the belt opposite to the coal carrying surface 15. However, the coal carrying surface 15 does engage the additional rollers 32.

Figure 4:
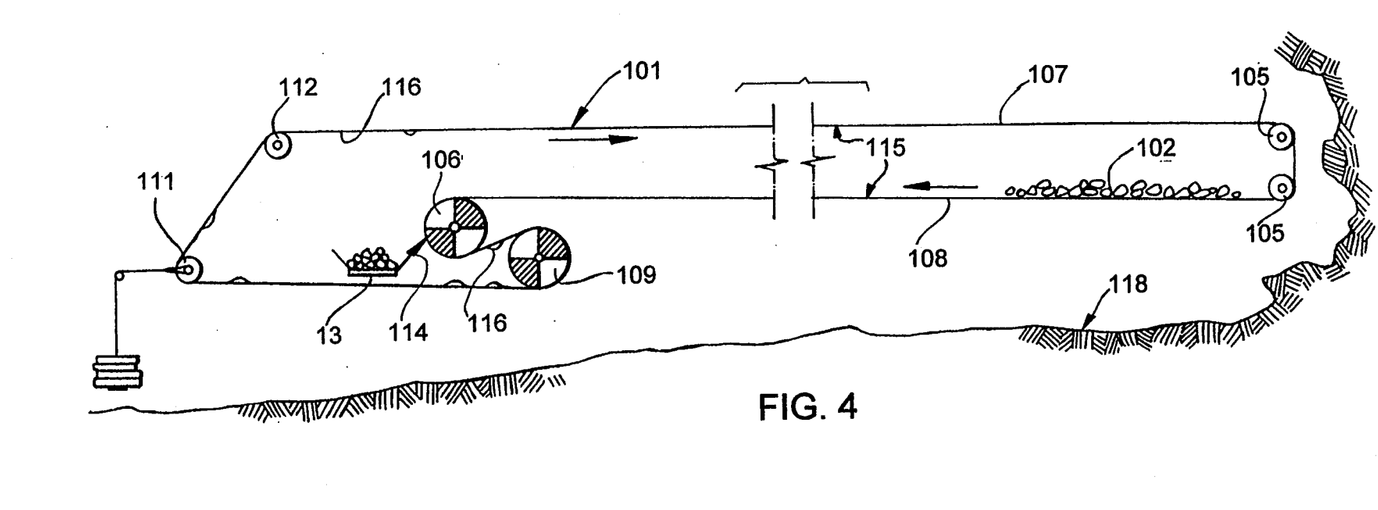
FIG. 4 is a view similar to FIG. 1 illustrating a first embodiment of the present invention.

FIG. 4 illustrates the first embodiment of the present invention which corresponds to the underground trunk conveyor of FIG. 1. Like parts to those of FIG. 1 are indicated by a numeral increased by 100. As seen in FIG. 4, at the coal face 103 are located a pair of spaced apart tail rollers 105. These define the upper and lower runs 107 and 108 respectively. The coal 102 is loaded onto the upper face of the lower run 108 which therefore constitutes the coal carrying surface 115. The lower run 108 also moves from right to left as seen in FIG. 4 and therefore constitutes the forward run. The discharge roller and one of the drive rollers are combined at roller 106, the belt 113 and scraper 114 being as before but being located within the loop formed from the belt 101. A pair of tensioning rollers 111 and 112 enable the belt 101 to complete its loop. The carry back material 116 adheres to the coal carrying surface 115 as before, however, this now forms the lowest surface of the upper run 107.

As a consequence, any carry back material 116 which is dislodged from the coal carrying surface 115 falls downwardly onto the coal carrying surface 115 of the lower run 108 whence it is conveyed to the combined discharge and drive roller 106, or falls onto the coal carrying surface 115 of the belt 101 extending between the drive roller 109 and the tensioning roller 111. In the latter case this material is ultimately carried to the lower surface of the upper run 108 where it can be dislodged, possibly by passing over an idler roller (not illustrated) and thereby fall onto the upper surface of the lower run 108.

It will be apparent to those skilled in the art that the above described arrangement constitutes and endless loop without twists and that, in addition, substantially all spillage is eliminated since the carry back material 116 falls back onto the conveyor belt 101 to be re-conveyed to the destination conveyor 113. It is also not necessary for the scraper 114 to be a hard scraper since it does not matter if the volume of the carry back material 116 is increased and the use of a light scraper ensures prolonged belt life.

Because there is no build up of spillage on the mine floor 118, there is no corresponding fire risk, nor is there any need for such deposits 117 to be cleaned away.

It will also be apparent to those skilled in the art that the changed operation of the tail rollers 105 leads to substantial improvements. The tail roller 5 of FIG. 1 is liable to have the deposits 17 enter onto the upper surface of the return run 8. Such debris, if a hard object, can puncture the belt 1. Softer material can adhere to the roller 5 itself. Material which does not adhere to the roller 5 circulates endlessly around the roller 5 being dropped back in by the return run 8 even if it clears the roller 5 since It falls from the upper run 7.

If this additional material comes more from one side than another, the roller 5 instead of being cylindrical becomes frusto-conical. As a consequence, the belt moves towards the larger diameter portion until the advancing edge of the belt hits some obstruction and tears.

In FIG. 4, however, the rollers 105 are essentially self-cleaning in that any material which falls onto the upper surface of the lower run 108 is carried away. Similarly, any material which falls onto the upper surface of the upper run 107 does not contact either roller 105 and falls clear of the belt.

Figure 5:
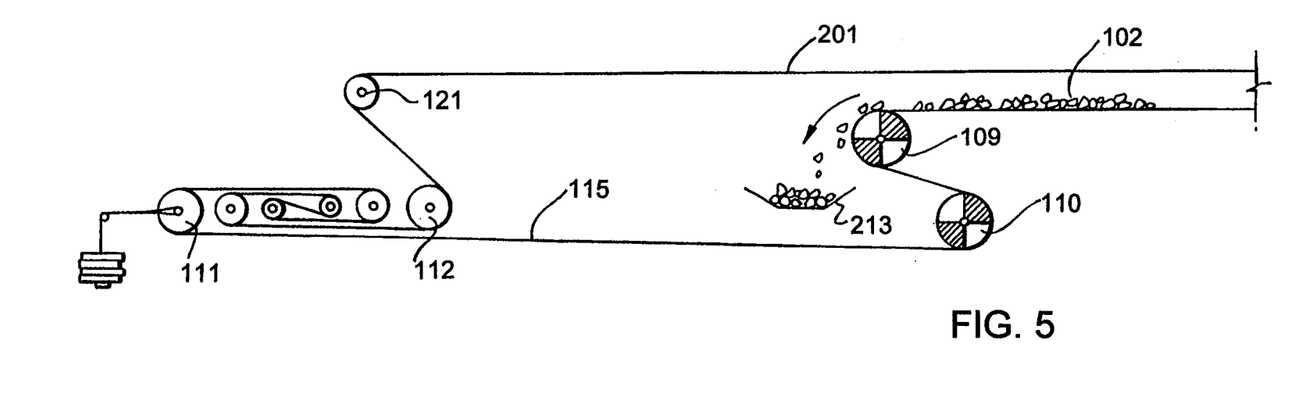
FIG. 5 is a view similar to FIG. 2 and illustrating the application of the present invention to a longwall maingate conveyor.

A second embodiment of the present invention applicable to a longwall maingate conveyor is illustrated in FIG. 5. The arrangement of the drive rollers 109, 110 is essentially as in FIG. 4 and the arrangement of the tensioning rollers 111,112 is essentially as in FIG. 2. The coal 102 is discharged onto the conveyor belt 213 which is transverse to the conveyor 201 and passes within the loop formed by the belt 201. It will be apparent to those skilled in the art that the coal carrying surface 115 of the belt 201 passes underneath the second conveyor 213 so that any material spilled therefrom at the discharge point automatically is eventually returned to the combined discharge and drive roller 109.

Figure 6:
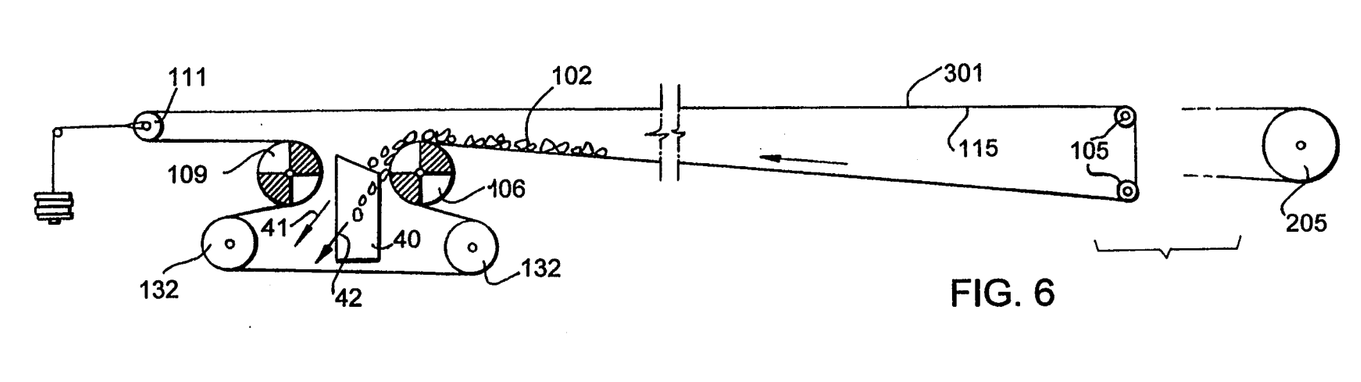
FIG. 6 is a view similar to FIG. 3 but illustrating the application of the present invention to a surface conveyor.

FIG. 6 illustrates the application of the present invention to the surface main conveyor of FIG. 3. Here the configuration of the combined discharge and drive roller 106, and drive roller 109, and additional rollers 132 is reversed and a splitting chute 40 provided so as to break the discharged coal 102 into two streams 41 and 42 as will be explained hereafter in more detail in relation to FIGS. 7 and 8. The tensioning roller 111 is essentially conventional and as illustrated in FIG. 6 either two tail rollers 105 or a single large diameter tail roller 205 can be provided as alternatives.

Figures 7, 8:
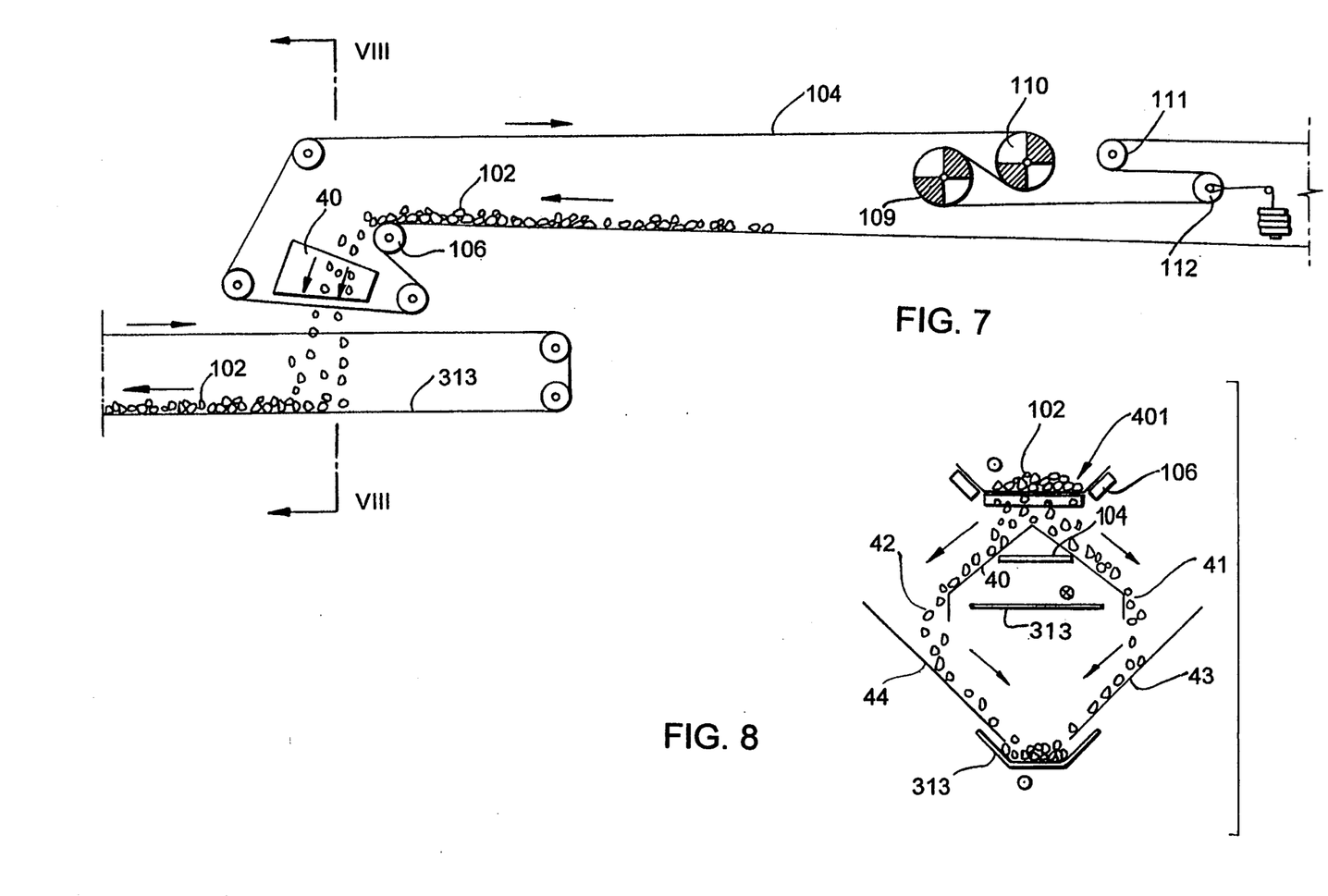
FIG. 7 is a view similar to FIG. 6 but illustrating in-line transfer with a remote drive.
FIG. 8 is a cross-sectional view taken along the line VIII—VIII of FIG. 7.

FIG. 7 illustrates the application of the present invention to in-line transfer with remote drive. It will be apparent that remote drive provides an advantage in that the drive rollers 109, 110 are located at some distance from the discharge roller 106 since the location of this roller need not necessarily be a convenient location for the drive rollers. FIGS. 7 and 8 clearly illustrate the splitting chute 40 which has a V-shaped transverse cross-section. As best seen in FIG. 8, the chute 40 divides the coal 2 into two streams 41, 42 which respectively impact upon corresponding inclines slides 43, 44 which cause the streams 41, 42 to rejoin and deliver the coal 2 to the upper surface of the lower run of the second conveyor 313. As indicated by dots and crosses in FIG. 8, the conveyor 401 in FIG. 8 is moving out of the page towards the reader, the upper run of the conveyor 313 is moving into the page away from the reader, and the lower run of the conveyor 313 to which the coal 102 is delivered is moving out of the page towards the reader.

Figure 9:
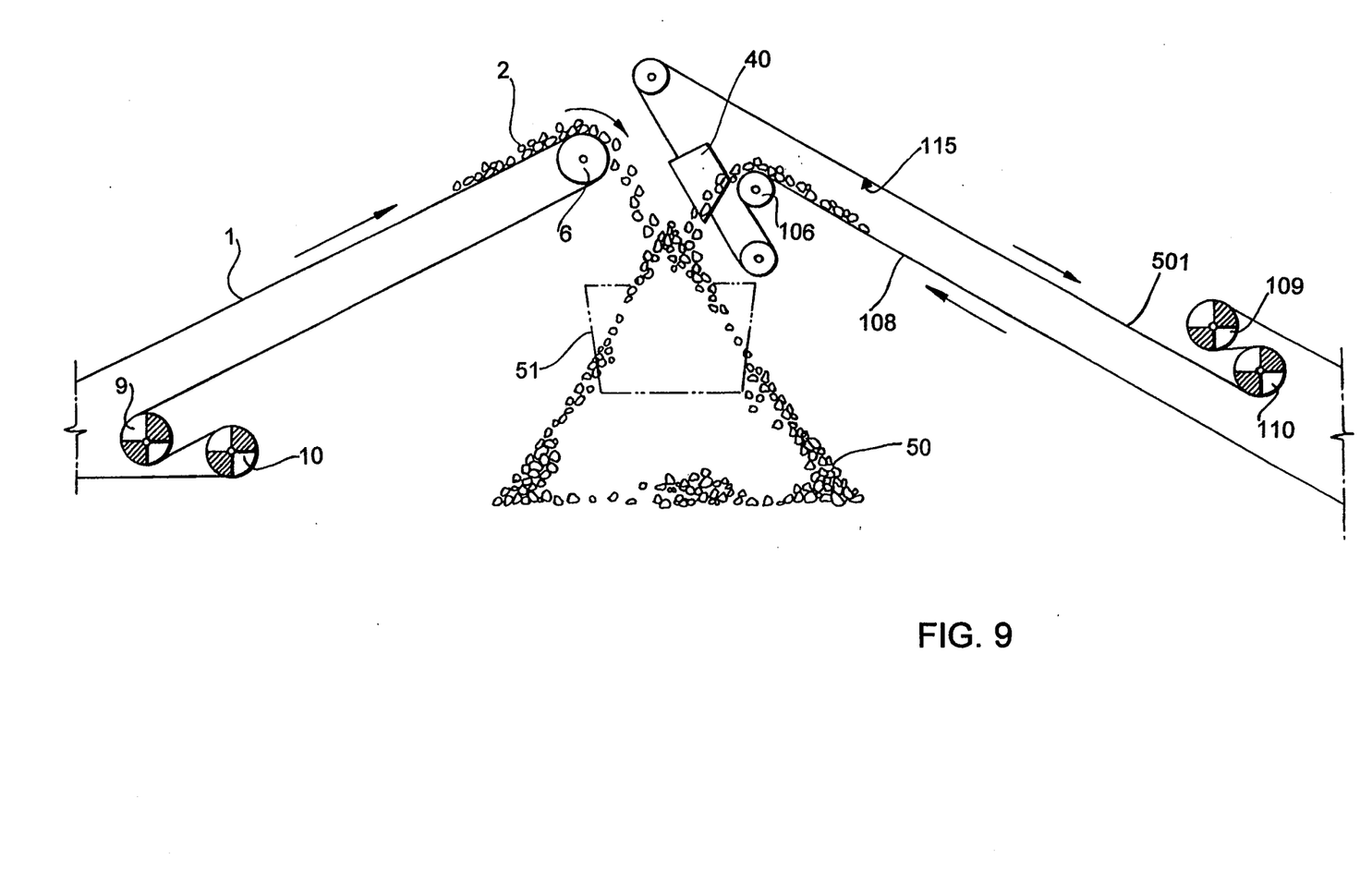
FIG. 9 is a schematic side elevational view illustrating, on the left a conventional conveyor discharging into a hopper or stockpile and, on the right, a stockpiling conveyor in accordance with an embodiment of the present invention similarly discharging.

FIG. 9 illustrates the application of the present invention to stockpiling, As schematically illustrated to the left of FIG. 9 a conventional conveyor 1 is loading coal 2 into a conventional stockpile 50 or into the open top of a rectangular hopper 51 illustrated by broken lines in FIG. 9. On the right hand side is the preferred embodiment of the present invention for this application. Here the conveyor belt 501 has coal 102 loaded on the upper surface of the lower run 508 and passes around a discharge roller 106. The coal 102 carried by the belt 501 is broken into two streams as before by means of a splitting chute 40 in order to deliver the coal to the stockpile 50 or hopper 51.

Figure 10:
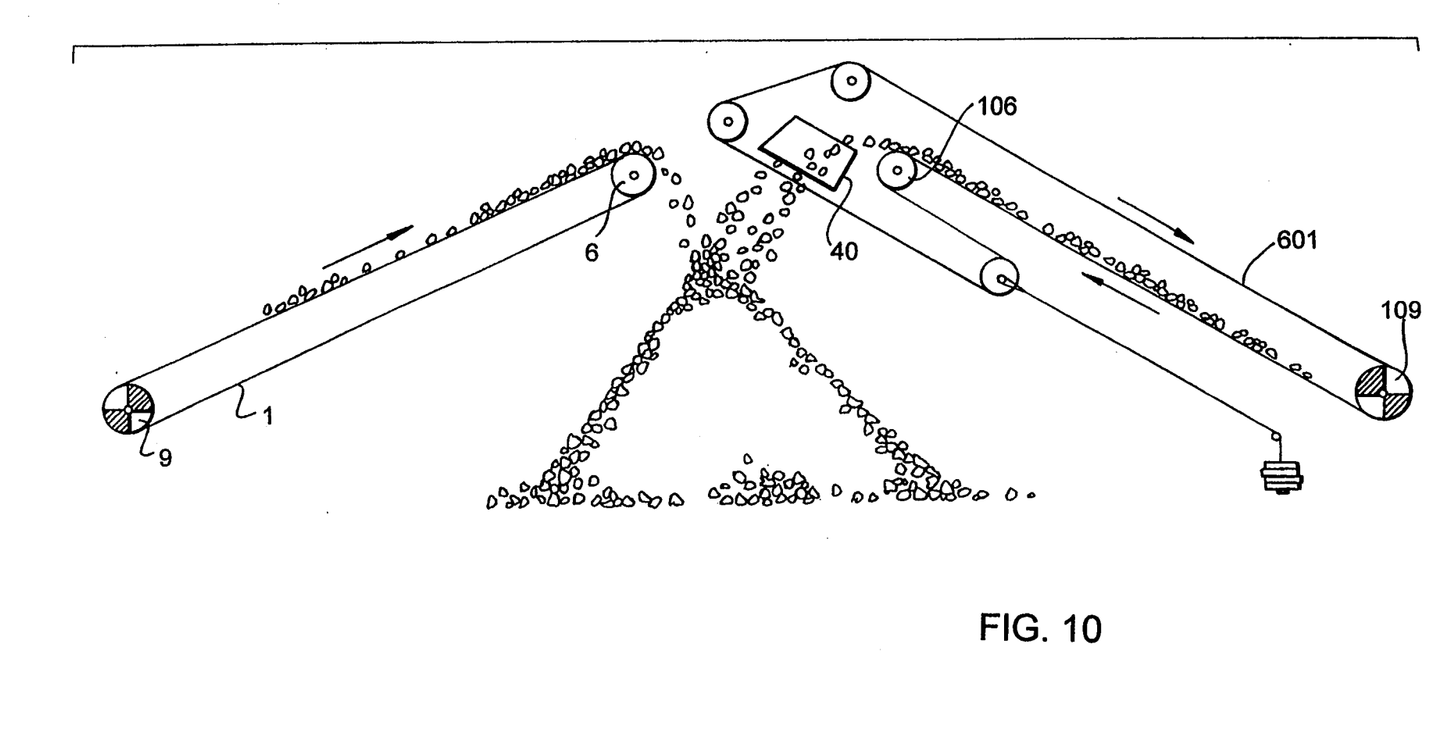
FIG. 10 is a view similar to FIG. 9, but illustrating stacker belts.

Turning now to FIG. 10, on the left is illustrated a conventional stacker belt and on the right a stacker belt modified in accordance with the invention. A single drive roller 9 or 109 drives each belt 1 and 601 respectively. The discharge rollers 6 and 106 are similar, however, three additional rollers including a tensioning roller 111 are provided for belt 601. Discharge is via a chute 40 as before. Since such stacker belts are normally rail mounted to move alongside a row stockpile, elimination of carry back material falling onto the rails is very useful. Also the tensioning mass can assist in counterbalancing the mass of the stacker boom and conveyed material. Tensioning by adjustment of the position of the discharge pulley 6 relative to the remainder of the stacker has the undesirable side effect of moving the centre of the stacker pile relative to the position of the rails and any device used to re-load the stockpiled material.

Figure 11:
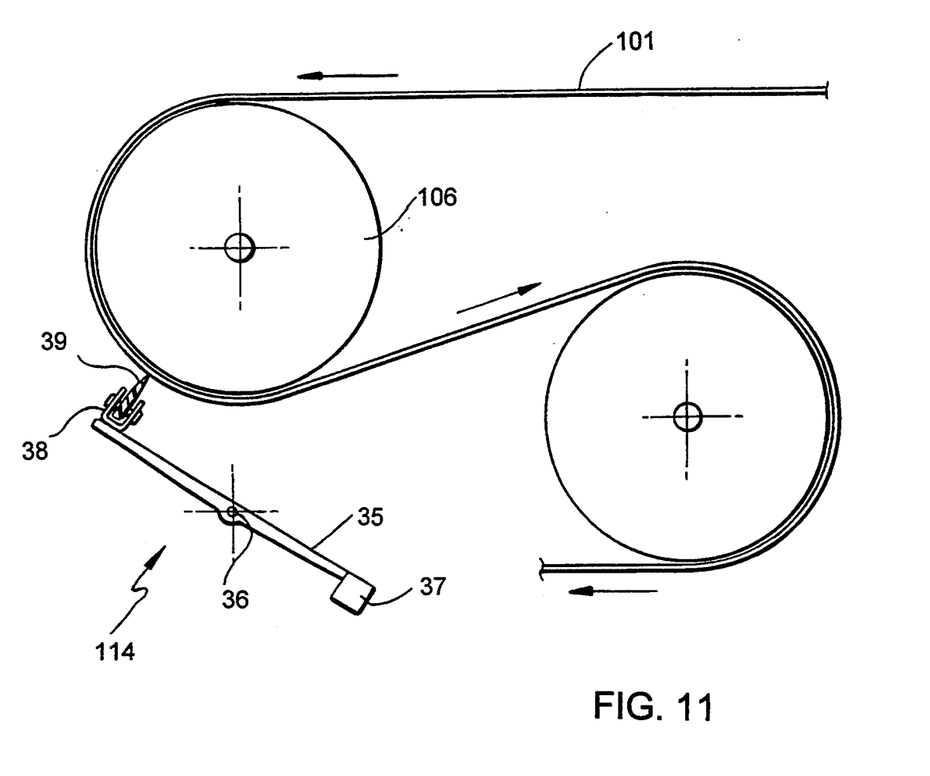
FIG. 11 is a schematic side elevation of a light acting scraper acting on the combined discharge and drive pulley of FIG. 4.

Turning now to FIG. 11, the "soft" acting scraper 114 of the preferred embodiment has an arm 35 pivotable about axis 36. As shown, the lower end of arm 35 has a weight 37 attached thereto and the higher end of arm 35 has a U-shaped channel 38 attached thereto. The U-shaped channel 38 has a rubber strip 39 bolted therewithin. The scraper 114 extends across the width of the belt 101.

In operation, the rubber strip 39 of the scraper 114 abuts as shown against the belt 101 as it turns around the discharge roller 106 by the presence of the weight 37 acting at the lower end of the pivotal arm 35. When the rubber strip 39 collides with load travelling on the belt 25, it will remove only that portion of the load equivalent to the removal capacity of the scraper 114, but will allow more sticky load to remain on the belt 101 by being deflected about pivot axis 36 away from the belt 101. After the sticky load has passed, the weight 37 will cause the rubber strip 39 to return and again &but against the belt 101 as shown.

The foregoing describes only some embodiments of the present invention and modifications, obvious to those skilled in the art, can be made thereto without departing from the scope of the present invention. For example, the tensioning of the belt is now preferably carried out between the tail rollers 105.

I claim:

1. A method for reducing belt spillage whilst conveying coal-like material by means of a conveyor belt comprising an endless loop having two runs positioned one above the other, extending between a source location and a destination location and, in operation, travelling in opposite directions, with at least the lower run passing over idler rollers; said method comprising the steps of loading said material to be conveyed onto only the upper surface of the lower one of said runs at said source location so that the face of said belt comprising the lower surface of said lower run is substantially free of said material; moving said lower run in the direction from said source location to said destination location; and discharging at said destination location substantially all said material from said lower run except any material adhering to said belt, said discharging being via a splitting chute which divides said discharged material transversely relative to the longitudinal direction of said belt, into two streams, each said stream passing to a corresponding one of two opposite edges of said belt, wherein that face of said belt comprising the upper surface of said lower run also comprises the lower surface of said upper run whereby any of said adhering material not discharged from said belt at said destination location and subsequently dislodged from said upper run lower surface anywhere between said source location and said destination location drops onto said lower run upper surface to be re-conveyed thereby to said destination.

2. A method as claimed in claim 1 wherein said two streams discharge directly onto another belt, a stockpile or a hopper.

3. A method as claimed in claim 1 wherein said each of said two streams discharge into respective ones of two opposed inclined slides which combine said two streams into a substantially single discharge.

4. A method as claimed in claim 1 wherein said endless loop is untwisted.

5. A method as claimed in claim 1 wherein discharge from said lower run is directed to a further belt which passes through said endless loop.

6. A method as claimed in claim 1 wherein the material carrying surface of said belt is lightly scraped after said material is discharged therefrom.

7. Apparatus for reducing belt spillage whilst conveying coal-like material, said apparatus comprising an endless loop of conveyor belt having two runs positioned one above the other, said runs extending between a source location and a destination location; drive roller means engaging said belt and arranged to drive said runs in opposite directions, said runs being spaced apart sufficiently at said source location to permit said material to be loaded onto the upper surface only of said lower run so that the face of said belt comprising the lower surface of said lower run is substantially free of said material; roller means over and around which said belt passes and configured to make that face of said belt comprising the upper surface of said lower run, the lower surface of said upper run, and discharge means including a splitting chute positioned below one of said roller means and onto which said loaded material falls except any of said loaded material adhering to said belt, said chute being substantially V-shaped in transverse cross-section to divide said falling material transversely relative to the longitudinal direction of said belt into two streams, each said stream passing to a corresponding one of two opposite edges of said belt, whereby any of said adhered material not discharged from said belt via said discharge means and subsequently dislodged from said upper run lower surface anywhere between said source location and said destination location drops onto said lower run upper surface to be re-conveyed thereby to said discharge means.

8. Apparatus as claimed in claim 7 wherein said belt passes through the V of said chute.

9. Apparatus as claimed in claim 7 wherein said chute is located above, and discharges directly thereto, another belt, a stockpile or a hopper.

10. Apparatus as claimed in claim 7 wherein said chute is located above two opposed inclined slides which face each other and open at their lower ends to a single discharge.

11. Apparatus as claimed in claim 7 wherein said roller means are configured not to twist said belt.

12. Apparatus as claimed in claim 7 wherein said drive roller means comprises two rollers which do not engage that surface of said belt which conveys said material.

13. Apparatus as claimed in claim 7 wherein said discharge means includes a scraper means positioned to scrap the material carrying surface of said belt, said scraper means being biased to lightly scrape said material carrying surface.

* * * * *